(12) United States Patent
Jhanji

(10) Patent No.: US 8,423,622 B2
(45) Date of Patent: *Apr. 16, 2013

(54) SYSTEMS FOR COMMUNICATING CURRENT AND FUTURE ACTIVITY INFORMATION AMONG MOBILE INTERNET USERS AND METHODS THEREFOR

(76) Inventor: Neeraj Jhanji, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,970

(22) Filed: Aug. 17, 2011

(65) Prior Publication Data

US 2011/0312343 A1    Dec. 22, 2011

Related U.S. Application Data

(63) Continuation of application No. 12/910,185, filed on Oct. 22, 2010, now Pat. No. 8,005,911, which is a continuation of application No. 11/871,190, filed on Oct. 12, 2007, now Pat. No. 7,822,823, which is a continuation of application No. 10/149,203, filed as application No. PCT/IB00/01995 on Dec. 13, 2000, now Pat. No. 7,284, 033.

(60) Provisional application No. 60/170,844, filed on Dec. 14, 1999.

(51) Int. Cl.
*G06F 15/16* (2006.01)

(52) U.S. Cl.
USPC ........... 709/206; 709/203; 709/219; 709/224; 709/225

(58) Field of Classification Search .................. 709/207, 709/223, 224, 203, 206, 219, 225
See application file for complete search history.

(56) References Cited

U.S. PATENT DOCUMENTS

| 4,754,428 A | 6/1988 | Schultz et al. |
| 5,223,844 A | 6/1993 | Mansell et al. |

(Continued)

FOREIGN PATENT DOCUMENTS

| EP | 0903679 | 3/1999 |
| JP | 09-20822 A | 7/1997 |

(Continued)

OTHER PUBLICATIONS

Internet Magazine (JP Edition), Nov. 1999.

(Continued)

*Primary Examiner* — Lianghche A Wang
(74) *Attorney, Agent, or Firm* — Mattingly & Malur, PC

(57) ABSTRACT

A computer-implemented method implemented via the Internet for coordinating a current or future event between a user of a mobile Internet device and other users communicating through the Internet. The method includes receiving the current or future activity information pertaining to the future event from the user via the mobile Internet device. The current activity pertains to an activity occurring at a current time relative to a time the future activity information is received. The future activity pertains to an activity occurring at a future time relative to a time the future activity information is received. The method further includes transmitting the current or future activity information to a backend database coupled to the Internet, the backend database being remote from the mobile Internet device. The method further includes rendering the current or future activity information accessible to at least one recipient via the Internet. The recipient represents a subset of the users coupled to the Internet and having access privilege to information pertaining to the current or future event involving the user.

83 Claims, 10 Drawing Sheets

U.S. PATENT DOCUMENTS

| | | | |
|---|---|---|---|
| 5,333,266 A | 7/1994 | Boaz et al. | |
| 5,493,692 A | 2/1996 | Theimer et al. | |
| 5,513,126 A | 4/1996 | Harkins et al. | |
| 5,731,757 A | 3/1998 | Layson, Jr. | |
| 5,790,790 A | 8/1998 | Smith et al. | |
| 5,878,215 A | 3/1999 | Kling et al. | |
| 5,892,909 A | 4/1999 | Grasso et al. | |
| 5,905,777 A | 5/1999 | Foladare et al. | |
| 5,918,158 A | 6/1999 | LaPorta et al. | |
| 5,933,811 A | 8/1999 | Angles et al. | |
| 5,935,211 A | 8/1999 | Osterman | |
| 5,959,543 A | 9/1999 | LaPorta et al. | |
| 5,960,406 A | 9/1999 | Rasansky et al. | |
| 5,970,122 A | 10/1999 | LaPorta et al. | |
| 5,974,300 A | 10/1999 | LaPorta et al. | |
| 6,016,478 A * | 1/2000 | Zhang et al. | 705/7.19 |
| 6,018,577 A | 1/2000 | Roach, Jr. | |
| 6,243,039 B1 | 6/2001 | Elliot | |
| 6,327,533 B1 * | 12/2001 | Chou | 701/500 |
| 6,442,263 B1 * | 8/2002 | Beaton et al. | 379/142.04 |
| 6,522,875 B1 | 2/2003 | Dowling et al. | |
| 6,542,075 B2 * | 4/2003 | Barker et al. | 340/506 |
| 6,546,336 B1 | 4/2003 | Matsuoka et al. | |
| 6,587,835 B1 * | 7/2003 | Treyz et al. | 705/14.64 |
| 6,716,101 B1 * | 4/2004 | Meadows et al. | 455/456.1 |
| 6,731,612 B1 | 5/2004 | Koss | |
| 7,017,159 B1 | 3/2006 | Baker | |
| 7,082,407 B1 | 7/2006 | Bezos et al. | |
| 7,133,907 B2 | 11/2006 | Carlson et al. | |
| 7,386,464 B2 | 6/2008 | Robertson et al. | |
| 7,664,669 B1 | 2/2010 | Adams et al. | |
| 2002/0052781 A1 | 5/2002 | Aufricht et al. | |

FOREIGN PATENT DOCUMENTS

| | | |
|---|---|---|
| JP | 10190889 | 7/1998 |
| JP | Hei11-96100 | 7/1998 |
| JP | 11-046215 A | 2/1999 |
| JP | 11039570 | 2/1999 |
| JP | 11-098556 A | 4/1999 |
| JP | Hei-11-143358 | 5/1999 |
| JP | 11-272698 A | 10/1999 |
| JP | 11-341546 A | 12/1999 |
| WO | WO 99/34628 | 7/1999 |
| WO | WO9940527 | 8/1999 |

OTHER PUBLICATIONS

Lotus Notes Magazine (JP Edition), No. 32, Jun. 1999.

Fujitsu Magazine, vol. 50, No. 4, Jul. 1999.

Office Action from Japanese counterpart patent application No. 2001-546019, mailed Jun. 29, 2010.

Office Action from Japanese counterpart patent application No. 2001-546019, mailed May 26, 2011.

Smailagic, ASIM et al., MoCCA: A Mobile Communication and Computing Architecture, ACM Sigmobile Mobile Computing and Communications Review, vol. 3 Issue 4, Oct. 1999, pp. 3.

Office Action from Japanese counterpart patent application No. 2001-546019, mailed Oct. 26, 2010.

IDO Corporation news release found at URL http://www.kddi.com/corporate/news_release/kako/ido/news/19990929.html, Sep. 29, 1999.

* cited by examiner

FIG. 1 imaHima?!™    What is imaHima?!

imaHima is an internet-based add-on communication service primarily for users of smart[1] phones allowing them to exchange information about current personal status such as activity, whereabouts, mood both privately and publicly.

What does it do?
Allows a user to send a "imaHima" request to the imaHima web server and receive information on the current status of friends/associates/people who have granted him imaHima privileges.

| name | public messages |
|---|---|
| Keiko | Working late tonight |
| Rika | At client site |
| Fujii | Lets meet in Shibuya |
| Jens | Looking for a tennis partner |
| Options | |

Neeraj (seeker)

imaHima Use

Usage scenarios:

| User | Coordinates | Desire | imaHima Use |
|---|---|---|---|
| High school/ college student | Downtown | Wants company over dinner but doesn't have a specific friend in mind | Uploads her message to imaHima. A friend who happens to be also looking for a dinner partner contacts her. |
| Office Lady | Home | Would like to know what her friends are doing at the moment (it's a Sunday) | Checks imaHima status of friends and plans her next move |
| Businessman | Office | Wants to know the current status of his technicians out in the field | Uses imaHima to check status of technicians and decides to forward customer request to one of them[2] |

1. Also accessible through PC or PDA over the internet. The web site imaHima.com will offer richer functionality e.g. more detail, graphical displays etc.
2. Other business applications could be around SFA, logistics tracking and (taxi) dispatching

FIG. 2 imaHima?!™ How does it look on the phone?

The user views[1] and modifies information from her/his personal imaHima HTML Page accessible from the mobile phone, PC or PDA (Neeraj's) imaHima Pages on the Smart Phone (sample)

Friends, Colleagues, Church Friends, Tennis Friends, Public
Grant Privilege- Yes, No Available, Busy, Custom,
Custom by Group, Custom
By Mate, Schedule Override Seeker Information[2]:
- My imaHima Status: Pvt | Working | Office Mates' Information:
- Keiko  Lonely  Hachiko
- Jason  Shopping Ginza
- Jens   Hima    Shinjuku
- Search  ◁▷△▽
- Prefs | Go Select to call or email My imaHima Mates:
- Group: Friends
- Keiko  09015025636  Y
- Jason  09056764532  Y
- Jens   09044512334  Y
- Rika   09056564433  N
- New | Edit | Go!

Update information

My imaHima Schedule:
- Show: Week
- Mon   8-9   Gym    Hiroo
- Fri   6-9   Free   Shibuya
- Day   0-0   What   Where
- New | Delete | Go!  ◁▷△▽ □

Select
Navigation buttons

Search, Search by Group, Search by Mate,
Search by Location, Search by Status, Search
By Time, Freeform Search My Mates, My Schedule,
Owner Info. Settings New Mate[3]   Edit Name, Telephone Number,
New Group     Group, Custom Message[4], Delete

1. Typically the user would view this information either before making a call or after calling if the called party was not reachable.
2. User is required by the system to update his own information before he can do a search.
3. In case the new mate is not already a user of imaHima, he could be invited via e-mail to join simply by entering his phone number.
4. Custom Message could be "I'll be in meeting till 6pm".

FIG. 3
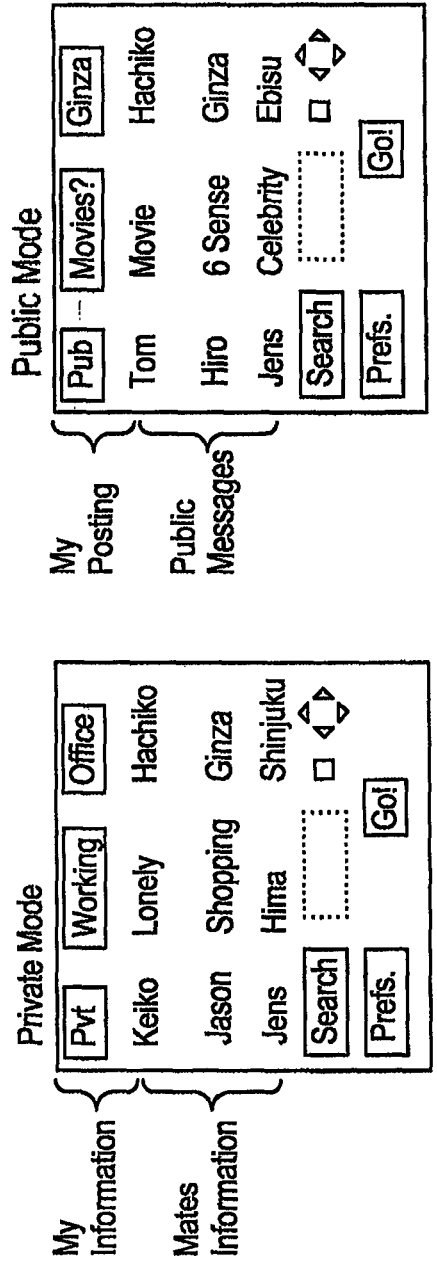
imaHima?! TM   What are public and private modes?
Private mode is for user to exchange information with his mates while public mode is more like a public bulletin-board
 (Neeraj's) Private Mode & Public mode (sample)

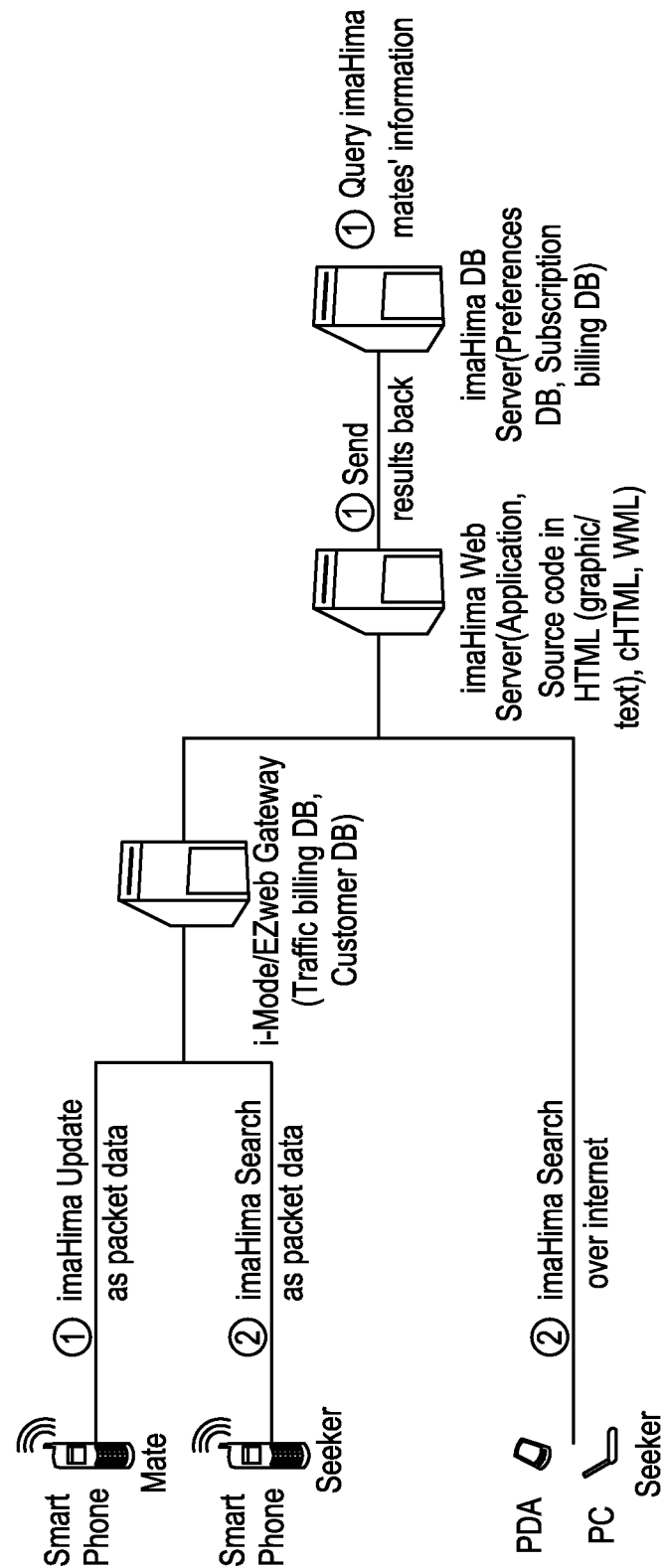

FIG. 5 imaHima?!™    How do I register from the phone?

Registration process is kept as simple as possible considering the needs of the smart phone users

Sign up Procedure[1]

- We send direct e-mail to the smart phone by generating all possible telephone number combinations.
- The e-mail shows up as one line statement or question which entices the user to click on the HTTP link below (e.g. imaHima shiteiru?! Or, otomodachi wa imaHima? Or, imaHima tomo wa iru? Or, want to know where Rika is? Or, a character is waiting for you here. Or, your friends may be imaHima now. Or, do you want to date Konishiki? Or, do you want to win a trip to imaHimaJima?....)
- The user out of curiosity, clicks the HTTP link (containing the phone number to which the e-mail was sent) and is connected to the website.
- He is welcomed at the site by the imaHima character and shown the status information of his mates on the first screen. If none, he is shown the public mode information.
- He now has the option to read more about imaHima and press "Yes" to join.
- He is then asked to enter phone numbers of friends (at least 3) he would like to invite.
- He enters his status information (which also allows him to participate in the sweepstakes).
- He enters profile[2] information (optional).

Log-in Procedure

- User stores the invitation e-mail sent to him as a cached page (optional password protected) and uses this page to sign-up (which automatically gives us his phone number each time).

1. In case the new user has been invited, he sees the invitation message from his friend, clicks on the link, is shown friend's status on the site, asked to grant privileges to his friend...
2. Profile could include information like profession, hobbies etc. and a stamp-size photo

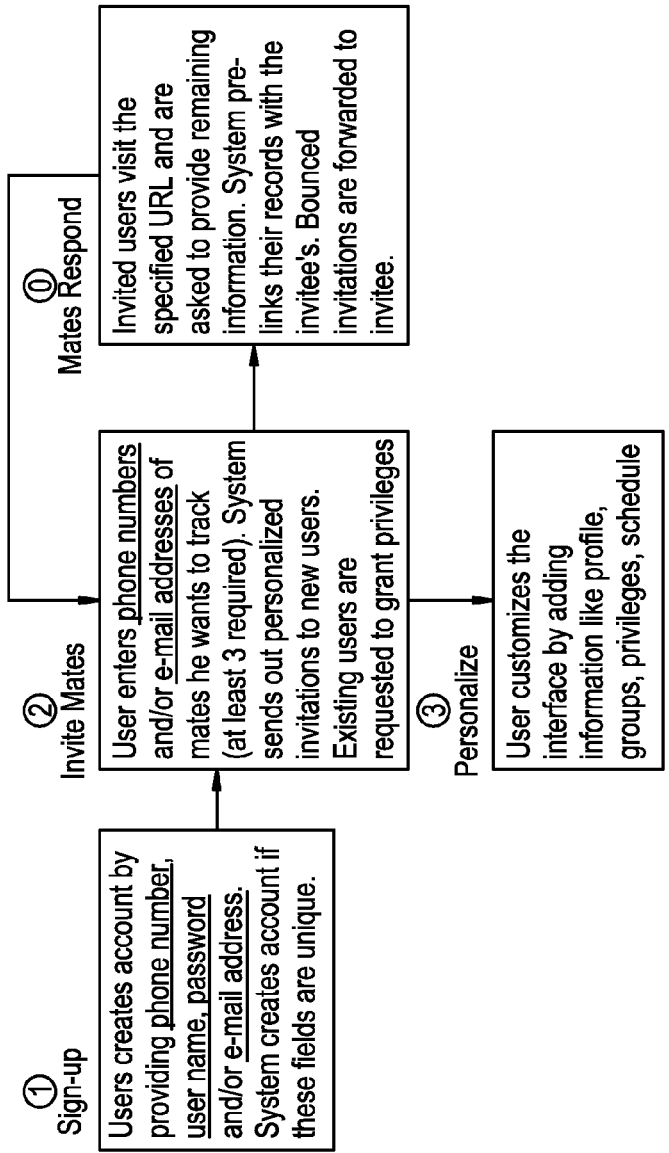

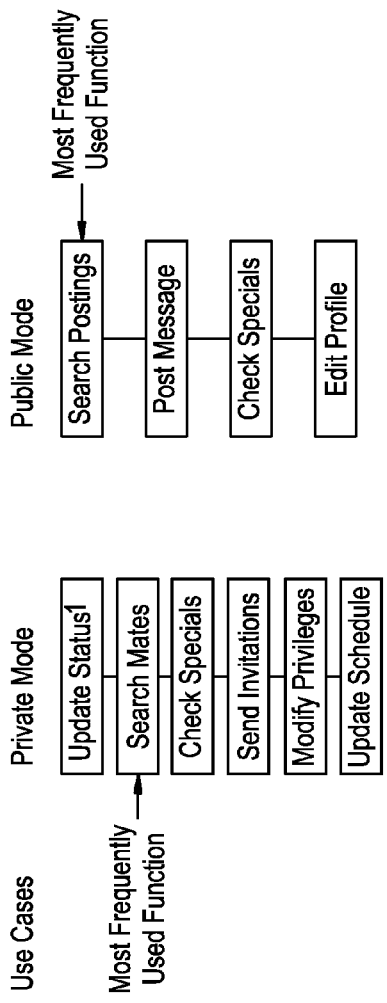

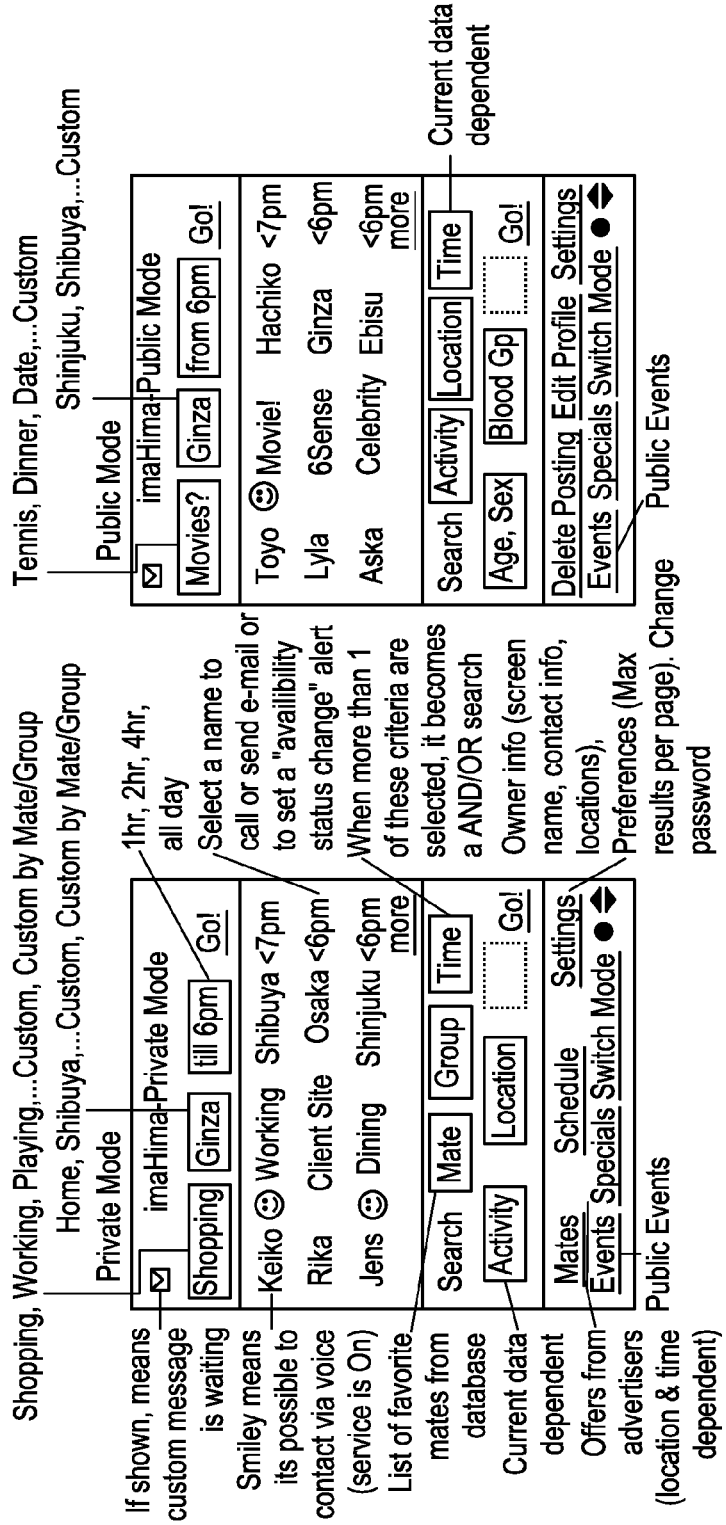

FIG. 9 imaHima?! TM    What will be the design like?

The interface would be designed to minimize screen jumps and provide direct access to often used functions. Users can share mates with other mates.

Mates

Mates-Request & Control Privileges

Friends, | New Mate[1] Request
Colleagues, | Email :090____@docomo.ne.jp  Other
Snowboard | Name ____ Customize
friends, | ☒ Offer Privileges  ☒ Allow Sharing — Enter custom greeting
Other, | for Group [Friends]  as [Individual] — and choose format (X-mas
Unfiled, All |              Forgot E-mail?[2] — New Year's etc.)
                                           Individual or Group
Jens, Rika, | Control Privileges
Keiko, Asako | Group [Friends]  Y  Edit  New — Shared Yes/No, Members,
...Other" |                                  Rename[3], Delete[3]
("Other" | Mate  [Jens]  Y  Edit  New — Sharing Yes/No, Crossing Path
brings up a |                              Alert Yes/No, Edit Name/Phone
searchable |        Go! — Number/Group Affiliation, Delete
list of all | Home                    ◆
mates)                                ●

Sign-On
Grant Privileges Step

Individual Privilege Request #1
User Neeraj has offered & requested privileges
☒ Grant Privilege  ☒ Allow Sharing
Add to Group [Friends]

Group Privilege Request #2
User Neeraj has offered & requested privileges for Group [Skaters]
☒ Join Group       ☒ Grant Privilege — Check one or none
☒ Allow Sharing
                 Go!                  ◆
                                      ●

1. The invitee would see a grant privilege Yes/No message next time he logs in/signs up. He can grant privileges to the requesting user and in case of a shared group, to the entire group. In case the invitation to the new user is not responded to within 3 days, it will be re-sent (also works in case the invitee missed seeing it). In case the invitation bounces, the invitor would be asked to provide an alternative e-mail address.

2. In case the user does not remember phone numbers at that time, he would have the option of simply leaving a name and providing the phone number at time of next sign up.

3. Only if it is an unshared group. Shared groups can be deleted only by the group owner i.e. the person who created it.

SYSTEMS FOR COMMUNICATING CURRENT AND FUTURE ACTIVITY INFORMATION AMONG MOBILE INTERNET USERS AND METHODS THEREFOR

CROSS-REFERENCE TO RELATED APPLICATIONS

This application is a continuation of application Ser. No. 12/910,185, filed Oct. 22, 2010, now U.S. Pat. No. 8,005,911, which is a continuation of application Ser. No. 11/871,190, filed Oct. 12, 2007, now U.S. Pat. No. 7,822,823, which is a continuation of application Ser. No. 10/149,203, filed Sep. 11, 2002, now U.S. Pat. No. 7,284,033, which was the National Stage of International Application No. PCT/IB00/01995, filed Dec. 13, 2000, and which claims priority from Application No. 60/170,844, filed Dec. 14, 1999, and from application Ser. Nos. 09/589,684 and 09/589,685, both filed Jun. 7, 2000, each of which are incorporated by reference and from which priority is claimed.

BACKGROUND OF THE INVENTION

The present invention relates to systems and methods for facilitating communication between mobile Internet users and for facilitating electronic commerce that is tailored to the communicated information. More particularly, the present invention relates to techniques for allowing users of Internet-capable mobile devices to communicate in a manner that takes into account user identity and profile, user status, user present and future/intended activity, user present and future/intended location, and time duration and for allowing merchants to promote goods and services in a more effective manner based on the user's communicated information and behavior profile.

As the Internet becomes more accepted and useful, there has been a tremendous amount of interest in endowing mobile devices, such as cellular phones, laptop computers, personal digital assistants (PDAs), pagers, and the like, with wireless Internet capability. Emails and access to web search engines are often cited as the two Internet applications that users wish to have access to while being away from their desktop Internet terminal. As manufacturers turn their attention to the wireless Internet market, consortiums and standards have evolved for bringing the power of the Internet to the wireless and miniaturized world of mobile devices. By way of example, technical proposals such as the Wireless Application Protocol (WAP) and mobile Internet (mobile IP) have received much attention in the press as of late.

As the wireless mobile Internet area is in its infancy and market penetration has been rather low, much of the current attention is directed toward issues involved in achieving an acceptable, data transmission rate, data security, and reliability via the wireless medium and in bringing desktop-type applications, which the users have long enjoyed on their desktop terminals, to the small screen of the typical mobile device. However, there has been less attention to other important implications of wireless Internet access, particularly implications that do not apply to stationary, desk-bound Internet users.

It is reasoned by the inventor herein that one implication of wireless Internet computing is that the mobile user's location may dynamically change with time as the mobile user moves about during his day. Since his Internet access is through a portable mobile device, the mobile user essentially carries the whole Internet with him from location to location. Accordingly, wireless mobile Internet access is capable of a whole range of applications vastly different from those applicable to stationary, desktop Internet access. With convenient mobile Internet access, the user may readily update his information to the Internet as well as utilize the Internet to search for information pertaining to other users, for example. For mobile Internet users, time and location become very important dimensions of the communication experience.

Furthermore, it is expected that mobile users will utilize wireless Internet access in a manner that is more integrated with their daily routines than their deskbound counterparts. Because of the small size, convenience, and portability of the portable Internet access devices, it is expected that mobile users will integrate Internet technology into their daily activities in ways that are simply not possible before. By way of example, a user employing an Internet-capable cellular phone may have Internet access while shopping, commuting, dining, strolling about town, and the like. It is expected that mobile Internet users will access the Internet to receive information, to communicate, to engage in electronic commerce, and the like while moving about handling their day-to-day chores. In contrast, deskbound users, because of the lack of mobility of their Internet access, are typically restricted to accessing the Internet only when at home, in the office, or at a location where Internet access through a desktop terminal may be found.

Two of the most challenging but potentially useful areas in wireless mobile Internet access involve mobile user coordination and electronic commerce. Mobile user coordination refers to time-dependent, activity-dependent and/or location-dependent coordination among individual mobile Internet users to enable them to coordinate in order to participate in a certain activity or accomplish a certain goal, either in the present time or at some future point in time. By way of example, a mobile Internet user may wish to coordinate an impromptu gathering with selected friends and may wish to use the Internet to both gather information about the friends' availability, current location, and/or current/planned activities and to invite the friends to meet at a specified location at a specified time. As another example, a mobile Internet user may indicate that he intends to be at some particular place in the future and invite/instruct others to meet at the same place. As yet another example, a mobile Internet user may be interested in a certain activity (e.g., shopping, playing tennis) at some specified location at some specified time (either in the immediate future or at some specified time in the future) and may employ the Internet to publish his intention to invite either selected others or anyone interested to participate.

Electronic commerce based on user location and activity information is another area that merchants are highly interested in. If the user past, current, and future activity and location are known, such information in conjunction with the user's behavioral and/or purchasing profile may allow a merchant to more precisely tailor the offering of their products or services and communicate such offering to the user to maximize the chance of purchase.

In the current art, users may attempt to employ emails to inform others of his coordination effort. However, even if emails become widely accessible by mobile Internet users, there are drawbacks to using emails for mobile user coordination purposes. For one, emails owes it popularity partly to the fact that it allows the user to attend to the emails only when convenient. The rest of the time, the received emails sit patiently in the receiver's mailbox, waiting to be read. However, this manner of use is incompatible with mobile user coordination of events that are location-dependent and are perishable with the passage of time. By the time the recipient gets around to reading his email, the time for the event may have already passed. Additionally, email is a "push" medium, which intrudes into the recipient's daily routine. This is particularly disadvantageous to mobile phone users who may wish to be notified with an audible warning (such as a ring) as soon as an email arrives.

Furthermore, email communication is intrusive in that it presumes that the recipients wish to receive and review the information sent by the senders. In fact, most Internet users nowadays are deluged with emails, most of them may even be well-intentioned, all of which require an undue amount of time every day to review and respond. Users resent this and for many users, the response has been to filter emails, either manually or automatically, so that only the urgent emails (e.g., those from superiors, loved ones, or work-related) are attended to right away and the rest ignored until a convenient time (such as at the end of the day or on weekends). Again, this manner of use is also incompatible with the needs of mobile user coordination pertaining to events which may be location-specific and time-sensitive.

Furthermore, unless a user sends out an email or responds to one, email communication does not allow others to query for one's availability, current location, mood, intended activity, location in the future, etc. without being intrusive. By way of example, a user cannot readily inquire about the current location or availability of another user without sending an email and requesting a reply or in some manner require a response from the other user, who may be busy or simply uninterested in the reason for the inquiry.

Additionally, email content tends to be free-form and is thus difficult for merchants to easily utilize the information contained therein for the purpose of determining the user's location, present and intended activity, and the like. Since such information is of great interest to merchants, the difficulty of ascertaining such information from free-form email communication is a drawback. Additionally, the free-form nature of email also renders it less convenient as a communication tool for mobile Internet users. This is because most mobile Internet users loath to enter free-form data on the miniaturized keyboard/handwriting recognition pad that are furnished with most mobile Internet devices today.

With regard to the need to furnish time-relevant location information for mobile Internet users, it has been proposed that the user's current location can be tracked using location-finding technologies such as Global Positioning System (GPS). In fact, it has been proposed that GPS circuitries be incorporated into mobile Internet devices in the future. However, there are drawbacks to such a proposal. For one, GPS tracking seriously threatens the privacy of the user of the GPS-enabled mobile Internet device since it renders it possible to track the user at every instant. For most users, this is the equivalent of being followed throughout the day and is simply an unwelcomed intrusion. The integration of GPS technology into mobile Internet devices also involves additional power requirement, complex circuitries and costs, both for the mobile Internet devices and for the transmission networks that handle them. As the majority of mobile Internet devices, as well as their support infrastructures, are not GPS-enabled today, it is also not possible to offer services based on GPS technology until a sufficient number of users and service providers have upgraded their equipment to work with GPS.

Still furthermore, although location-finding technologies such as GPS can track a given user's current location, no information is available about that user's current activity, future activity, intended future location at a specified time, and/or availability/willingness to participate. Yet, these are some of the pieces of information that may be very useful in a mobile user coordination application.

Group calendar programs are another class of desktop application programs that may conceivably be used for coordinating mobile users. However, most group calendar products are directed toward small, closed groups, i.e., groups whose members are known and/or formed in advance to further a particular goal such as employees of a business. The available group calendar products are, for the most part, ill adapted for use via the Internet wherein the number and identity of users may not be known in advance and wherein the range of activities proposed may be infinite. By way of example, most group calendar programs are not well adapted for allowing previously unknown users to sign on and perform searches and for allowing the users to control the privacy settings for individual items of information about themselves. As another example, group calendars tend to work by posting information on calendars of others, a paradigm that is unsuitable when the size of the group that a user wishes to gain expose to may be as large as the Internet community itself. In fact, most group calendars become unmanageable when the size of the group become too large and the sheer volume of calendared events overwhelm most users (giving rise to a problem not unlike the spam email problem). This paradigm also tends not to work well on the miniaturized screens of most mobile Internet devices, which render it difficult to view a large amount of displayed data.

Additionally, because calendar products tend to be employed by users to plan their day and activities, the majority of which involve private activities and typically do not include other users, most of the entries therein are inapplicable for use in mobile user coordination applications (which, by design, are directed toward sharing information among mobile users). Also, daily calendar information (versus posted information designed to invite participation by others) is typically considered highly private by most users, and a user tend to be reluctant to disclose such information to others (which partly explains the relative lack of use of such products nowadays and where they are used, only for work-related purposes and work-related entries among small, known group of people). Because most people tend to associate a greater degree of privacy with their calendar entries, using calendar information for the purpose for promoting goods and services by merchants may provoke an unduly negative reaction among users.

A case can be made for maintaining multiple calendars, one of which could be designated for public/semi-public access so that other users can review the calendared information for the purpose of deciding whether they wish to participate. However, such a solution tends to be impractical as users typically do not want to have to keep track of which calendar to use for which purpose since the goal of using a calendar, after all, is to centralize information in one location for the purpose of planning one's day.

Furthermore, most group calendar products are not well adapted to the needs of mobile Internet users, who inherent characteristics is constantly changing location. This is hardly surprising since group calendar products were developed primarily for the desktop Internet users. Furthermore, most group calendar products also involve unstructured data entry, which tends to be less attractive for mobile Internet users who, as mentioned earlier, have to contend with the limited screen space and keyboard/handwriting recognition pad of their mobile Internet devices. Still further, the group calendar products currently available, being developed for desktop computers, tend to require a large amount of memory, permanent storage, and processing power to run. Most of these programs exist as executable codes permanently stored on the desktop computers. Permanent and random access memory, as well as computing power and battery life, are of course limited resources on mobile Internet devices, thus rendering the current generation of group calendar products unsuitable for use on the mobile Internet devices. Instant messaging, which is a technology developed when Internet access was primarily accomplished via desktop terminals, also suffer many of the same deficiencies. Through instant messaging, it is now possible to inform other users of the user's current activity and availability. However, instant messaging as it is currently implemented does not account for the mobile nature of users (as would be the case when users access the Internet wirelessly via mobile Internet devices) or the time-dependent nature of the activities involved. For example, there is no established facility within instant messaging to allow users to invite others to a planned activity happening at some predefined time in the future at some predefined location (or allow others to search for the same). Instant messaging applications also require downloading executable codes, a requirement that is typically unwelcomed by users of the mobile Internet devices who are constantly challenged with doing more with less power consumption, and less computing and memory resources.

Because of these shortcomings, these technologies, which were developed when desktop Internet access were the predominant mode of access, do not adequately serve the needs of the mobile Internet users. As front-ends for electronic commerce applications, they also have many deficiencies. In view of the foregoing, there are desired improved techniques for allowing mobile Internet users to communicate for the purpose of coordinating activities and to allow merchants to employ user identity and behavior/shopping profile, user status, user present and future/intended activity, user present and future/intended location, and/or time duration in the promotion of goods and services.

SUMMARY OF THE INVENTION

The invention relates, in one embodiment to a computer-implemented method implemented via the Internet for coordinating an activity between a user of a mobile Internet device and other users communicating through the Internet. The method includes receiving activity information pertaining to the event from the user via the mobile Internet device. The activity pertains to an activity occurring during a time period that overlaps the time the activity information is received. The method further includes transmitting the activity information to a backend database coupled to the Internet, the backend database being remote from the mobile Internet device. The method further includes rendering the activity information accessible to at least one recipient via the Internet. The recipient represents a subset of the users coupled to the Internet and having access privilege to information pertaining to the event involving the user.

The invention also relates, in another embodiment, to a computer-implemented system for coordinating an activity between a user of a first mobile Internet device and other users communicating through the Internet. The computer-implemented system includes a server arrangement coupled to the Internet. The server arrangement includes first codes and second codes. The first codes is configured to implement a first application program using a web-based paradigm on the first mobile Internet device. The first application program is implemented with the first codes transmitted from the server arrangement to the first mobile Internet device. The first application program is configured to receive activity information pertaining to the activity from the user. The activity pertains to an activity occurring during the time period overlapping the time the activity information is received. The computer-implemented system also includes a backend database coupled to the server arrangement. The backend database is configured to be in communication with the first application program via the Internet. The backend database is configured to receive the activity information from the first application program. The backend database is remote from the first mobile Internet device. The second codes is configured to implement a second application program using the web-based database on a second mobile Internet device. The second application program is implemented with the second codes transmitted from the server arrangement to the second mobile Internet device. The second application program is configured to render the activity information to a recipient via the second mobile Internet device. The recipient represents a subset of the users coupled to the Internet and having access privilege to information pertaining to the event involving the user.

The invention relates, in one embodiment to a computer-implemented method implemented via the Internet for coordinating a future event between a user of a mobile Internet device and other users communicating through the Internet. The method includes receiving future activity information pertaining to the future event from the user via the mobile Internet device. The future activity pertains to an activity occurring at a future time relative to a time the future activity information is received. The method further includes transmitting the future activity information to a backend database coupled to the Internet, the backend database being remote from the mobile Internet device. The method further includes rendering the future activity information accessible to at least one recipient via the Internet. The recipient represents a subset of the users coupled to the Internet and having access privilege to information pertaining to the future event involving the user.

The invention also relates, in another embodiment, to a computer-implemented system for coordinating a future event between a user of a first mobile Internet device and other users communicating through the Internet. The computer-implemented system includes a server arrangement coupled to the Internet. The server arrangement includes first codes and second codes. The first codes is configured to implement a first application program using a web-based paradigm on the first mobile Internet device. The first application program is implemented with the first codes transmitted from the server arrangement to the first mobile Internet device. The first application program is configured to receive future activity information pertaining to the future event from the user. The future activity pertains to an activity occurring at a future time relative to a time the future activity information is received. The computer-implemented system also includes a backend database coupled to the server arrangement. The backend database is configured to be in communication with the first application program via the Internet. The backend database is configured to receive the future activity information from the first application program. The backend database is remote from the first mobile Internet device. The second codes is configured to implement a second application program using the web-based database on a second mobile Internet device. The second application program is implemented with the second codes transmitted from the server arrangement to the second mobile Internet device. The second application program is configured to render the future activity information to a recipient via the second mobile Internet device. The recipient represents a subset of the users coupled to the Internet and having access privilege to information pertaining to the future event involving the user.

Another aspect of the present invention is a computer-implemented method implemented via the Internet for facilitating commercial offering to a user of a mobile Internet device, said commercial offering pertaining to a product or a service provided by a merchant. The method comprises receiving a first set of data pertaining to an activity from said user via said mobile Internet device, said activity pertaining to an activity occurring during a time period which overlaps a time that said activity information is received, said first set of data including an activity type and location information. The said first set of data is transmitted to a backend database coupled to said Internet, said backend database being geographically remote from said mobile Internet device. The first set of data is compared with a second set of data in said backend database, said second set of data including activity and location information received from said merchant prior to said receiving said first set of data from said user. If information in said first set of data satisfies conditions specified in said second set of data, the commercial offering available is rendered to said user via said Internet device through said Internet.

Preferably, the second set of data also includes time information, wherein said commercial offering is rendered to said user only if said time period also overlaps with a time specified by said time information.

Preferably, the activity type is shopping.

Still preferably, the activity type is eating.

Still preferably, the second set of data includes age information, wherein said commercial offering is rendered to said user only if an age of said user satisfies conditions specified by said age information.

Still preferably, the commercial offering represents an electronic coupon to be redeemed at a store operated by said merchant.

Yet another aspect of the present invention is a computer-implemented method implemented via the Internet for facilitating commercial offering to a user of a mobile Internet device, said commercial offering pertaining to a product or a service provided by a merchant. The method comprises receiving a first set of data pertaining to an activity from said user via said mobile Internet device, said activity pertaining to an activity occurring during a time period which overlaps a time that said activity information is received, said first set of data including an activity type and location information. The first set of data is transmitted to a backend database coupled to said Internet, said backend database being geographically remote from said mobile Internet device. Parameters in a second set of data is compared with a third set of data in said backend database, said second set of data including said first set of data and data pertaining to an activity entered by another user different from said user, said third set of data including activity and location information received from said merchant prior to said receiving said first set of data from said user. If information in said second set of data satisfies conditions specified in said third set of data, the commercial offering available to said user is rendered via said Internet device through said Internet.

Preferably, the third set of data also includes time information, wherein said commercial offering is rendered to said user only if said time period also overlaps with a time specified by said time information.

Preferably, the third set of data includes age information, wherein said commercial offering is rendered to said user only if an age of said user satisfies conditions specified by said age information.

Still another aspect of the present invention is a computer-implemented method implemented via the Internet for facilitating commercial offering to a user of a mobile Internet device, said commercial offering pertaining to a product or a service provided by a merchant. The method comprises receiving a first set of data pertaining to an activity from said user via said mobile Internet device, said activity pertaining to an activity occurring during a time period which overlaps a time that said activity information is received, said first set of data including an activity type and location information. The first set of data is transmitted to a backend database coupled to said Internet, said backend database being geographically remote from said mobile Internet device. Parameters in a second set of data are compared with a third set of data in said backend database, said second set of data including said first set of data and historical purchase history by said user, said third set of data including activity and location information received from said merchant prior to said receiving said first set of data from said user. If information in said second set of data satisfies conditions specified in said third set of data, rendering said commercial offering available to said user via said Internet device through said Internet.

Preferably, the purchase history by said user is updated in said backend database if said electronic coupon is redeemed.

Preferably, the first set of data also includes time information, wherein said commercial offering is rendered to said user only if said time period also overlaps with a time specified by said time information.

Still preferably, the third set of data includes age information, wherein said commercial offering is rendered to said user only if an age of said user satisfies conditions specified by said age information.

Further aspects of the present invention include computer program products, including computer readable media comprising instructions. These instructions enable one or more computers to perform the methods disclosed above.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a graphical depiction of one exemplary implementation.

In FIG. 2, three sample views are provided.

In FIG. 3, an explanation of the two modes of operation is provided.

In FIG. 4, an exemplary system architecture is proposed.

In FIG. 5, exemplary registration and log-in procedures are illustrated.

FIG. 6 shows greater details pertaining to one exemplary registration procedure.

In FIG. 7, exemplary application flows are illustrated to show how the service would normally be used.

In FIG. 8, exemplary views of the public mode and the private mode are illustrated.

In FIG. 9, exemplary views of the mates screen and the sign-on screen are shown.

DETAILED DESCRIPTION OF THE PREFERRED EMBODIMENTS

Figure 10:
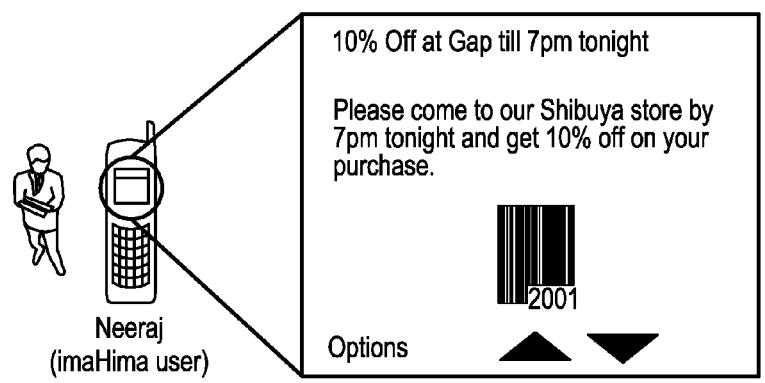
In FIG. 10, exemplary views of e-coupon activity are shown.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, there is provided a communication system implemented over the Internet for allowing users of Internet-capable mobile-devices (herein mobile Internet users) to make available and to control the sharing of information about himself (or other users), availability status for various modes of communication (e.g., by phone, by email, and/or pager), activity (present or planned), location (present or planned), and the time duration valid for such present or planned activity. Since the postings may include information not only about the user profile, status, and current activity but also about future planned activity, location (current and planned), and the time component, the communication system proposed is highly suitable for mobile Internet usage, particularly in the area of mobile user coordination wherein the relevance of the communication is highly dependent on the status/activity/location/time information pertaining to various users. Furthermore, the proposed communication system permits a user to announce his present or future location activity status to multiple people at once, who can view it from the system website at the time of their choosing. The proposed communication system also increases the likelihood of chance encounters (through the use of the public mode, for example) and enables users to communicate simple invitations in an unobtrusive manner, which, if they had been issued via emails, would have been perceived as "spamming." Furthermore, unlike group calendars which work well for planned time but does not work well for unplanned activities, the proposed communication system works particularly well for a user or group of users who want to find others to take advantage of unplanned time or a block of time that has suddenly become available.

Among the first considerations of the proposed communication system is ease of data entry for mobile Internet users, reduced resource requirements for executing the application, as well as gaining a critical mass of user participation. Ease of data entry is critical for mobile Internet users since mobile Internet devices are typically severely limited in its data entry capability (e.g., most do not have a full size keyboard to save space), its display capability (e.g., most have a small screen to facilitate portability and to reduce power usage). To this end, the inventive application employs innovative interfaces to reduce the amount of data entry and further to reduce the number of screen jumps or scrolling that the user has to perform while entering data. As will be shown in the exemplary implementation below, extensive use of drop-down lists is employed whenever possible to allow data entry by the point-and-click (or point-and-tap) method. As one example, it is envisioned that location entry may be made by tapping on a map displayed on the screen. It should be noted that the current location status is self-declared. Furthermore, the selectable items in the drop-down lists are intelligently ordered so that the items most likely to be selected will be presented first in order to minimize scrolling. By way of example, locations that the user most frequently visit may be listed in the drop-down list for entered locations. As another example, context analysis may be employed to present more intelligent choices (e.g., presenting time selections of 11:30 AM, noon, and 12:30 PM first when the action relates to lunch instead of presenting time selections for the evening).

Reduced resource requirement is addressed by the innovative methods described herein, which eliminates the use of exotic and power-hungry technologies such as GPS for location determination. As will be discussed later herein, the invention preferably requests the location description from the user in order to maximize the chance that such description will be understood by the intended recipient and to allow the user some measure of control over the privacy of the input information. As noted, the location information is self-declared.

Further, unlike prior art group calendar programs, the inventive technique preferably requires little, if any, resident executable codes, thus minimizing the need to store such codes permanently in the mobile Internet device and/or the need to download and install such codes. All these techniques reduces the processing, memory and/or I/O requirements, which contribute to lower power consumption and render the inventive communication system more adaptable for use with mobile Internet devices.

In one embodiment, the user profiles, status, and posted information for mobile user coordination purposes are stored in a backend database system, which is coupled to the Internet and remote from the mobile Internet devices, to reduce the need to store large volumes of data locally on the mobile Internet devices. The database of user profiles, status, and posted information may then be accessed by the mobile Internet users through their mobile Internet devices using a web-based paradigm (e.g., by filling out webpages which are served up to the user upon accessing the service's website) in order to reduce the need to download executable codes or to store executable codes on the mobile Internet devices.

Preferably, updates of user profile and status, as well as posting of information occur through webpage entries to be uploaded to the backend system, which resides in the Internet. Likewise, search parameters may also be inputted via webpage data entry. To minimize power, memory, and processing requirements on the part of the mobile Internet devices, memory and processing-intensive tasks such as database storage, database updates, database searches, and the like preferably occur remotely at the backend system instead locally on the mobile Internet devices. Communication of search results and other forms of communicated information between the backend system and the individual users also preferably occur through webpages. Data entry of user information, profile, and status, as well as searches through the profiles, status updates, and posted information associated with other users are accomplished through the use of web-based forms, which both minimize/eliminate the need for local executable codes and facilitate compatibility across different mobile Internet devices.

A critical mass of user participation is required to make any application that rely on users sharing data useful. To address this point, innovative methods are described herein to make the service more convenient for users, as well as to arouse potential user's desire to be part of the system for the purpose of communicating with others.

In accordance with one aspect of the invention, privacy is protected since the sharing of the posted information is fully controlled by the user himself. In one embodiment, the location information (present and/or future) is entered by the user himself through the mobile Internet device, thereby giving him full control of whether to let the system (and thus anyone else) know his location information. This is one important advantage of the present invention. As will be discussed later, even after the user enters his location information, privacy protection is provided by allowing the user to control the dissemination of the posted information.

Another advantage of this mode of information location entry is that the information entered may take any form that may be understood by the intended recipient. The location information can be fully descriptive (e.g., "Restaurant Mikasa on Main Street") to ensure understanding or in a secret code that is only understood among selected friends (e.g., "place where we usually meet for lunch") to provide an additional measure of privacy. The ability to control the content of the location information, which is not available with location-finding technologies such as GPS, allows the content to be tailored for improved understanding and/or privacy and is an important benefit of the present invention.

Another important benefit of this mode of location information entry is the ability to include and utilize location information for communication purposes in the communication system of the present invention without requiring the use of complicated location-finding technologies such as GPS, which would increase the power consumption, cost, and complexity of the mobile Internet devices. In this manner, the communication system proposed can be implemented today without requiring updates by users and wireless service providers to GPS technology. With the current method of information entry, users can communicate their location information irrespective whether the person posting the information or the person accessing the posted information has the ability to receive and/or understand GPS information.

Although this method of location information entry may not furnish instantaneous location updates all the time, such is not an important issue in most mobile user coordination applications. Because time is another component of the information entered, other users may readily ascertain, from the data pertaining to when the location information is updated, the nature of the activity involved, the expiration time and/or common sense, whether the posting is still valid. By way of example, location data about a movie (e.g., "watching a movie at the theater on $5^{th}$ Street") is probably not valid if entered more than six hours ago. As another example, location data about lunch (e.g., meeting friends for lunch at restaurant Mikasa on Main Street") is most likely invalid if the current time is evening. Of course, if the activities entered are accompanied by explicit time duration information (e.g., watching a movie theater on $5^{th}$ Street until 8 PM), another user accessing such information may readily determine whether the posting is still valid in view of the current time. In one embodiment, expired activity entries are either not displayed or clearly marked as such (e.g., "previous known status") as soon as the current time exceeds the end time of the activity entry.

Although user entry for location information is one advantageous mode of operation, it is contemplated that as future automatic location-finding technologies are phased into mobile Internet devices, the user may also utilize the location finding information to assist in the entry of his current location information. By way of example, GPS coordinates, the location of the wireless transmitter which the user employs for wireless communication, the use of the wireless phone network to determine user location, and the like, may be used as a substitute for or a supplement to the current location information entered by the user.

An important aspect of the present invention pertains to the ability to furnish future location information. For mobile user coordination applications, specifically in situations where users try to coordinate an event to happen in the future at some location, this information is of course highly useful. Again, the future location information may be entered by the user in the same way that he enters his current location information, i.e., via the user interface of the mobile Internet device. This is an important advantage since there is no simple way to accomplish the entry of future location with location-finding technologies, such as GPS, since location-finding technologies are useful only for finding a current location. Although electronic databases of locations exist and theoretically could allow a user to look up the information pertaining to a location other than his current location, this is not easily or conveniently done today due to the limitations in transmission speed, display screen size, memory and/or storage of most mobile Internet devices.

The inclusion of the time component, in addition to furnishing information about the probable validity of the activity/location posted, also facilitates the posting of information pertaining to a future planned event at some future point in time and/or location. This is an important advantage since it allows users to communicate not only about current activity/location but also about intentions or proposals regarding a future activity and/or location. This has tremendous applications in the mobile user coordination applications as it allows the planning of, invitation to, and/or searching for events that has yet to happen. By way of example, a user may now post information pertaining to a proposed meeting at a certain location at a certain time period and make the posting accessible to selected users or to the public to allow them to plan accordingly.

In order for other users or groups of users to access such posted information, access privilege needs to be granted by the original posting user. Access privilege can be granted to individual users, to all users belonging to predefined groups, or even to the entire public (e.g., for information that the original posting user does not deem to be highly private). Further, different items of information pertaining to a particular user may have different access privilege associated therewith. By way of example, a particular user may grant the public access to his name and email address but may withhold from the public the privilege to check on his current location and/or email address (which may be made available only to selected friends, for example).

In one embodiment, the Internet-capable mobile devices represent Internet-capable cellular phones although, as mentioned earlier, other devices including laptop computers, personal digital assistants (PDAs), pagers, and the like, may also employ the techniques disclosed herein. Preferably but not necessarily, the communication system is implemented such that the front-end for posting information or reviewing the posted information is accessible through a web browser (i.e., an application for accessing websites and webpages). In the case of Internet cellular phones, the front-end may be a manufacturer-specific web browser or one that adheres to an industry standard, e.g., the Wireless Application Protocol (WAP) standard. Even more preferably, access to the inventive communication system for the purpose of posting information and/or accessing the posted information by others (and/or other communication via the inventive communication system) may be accomplished via standard browser technologies (e.g., HTML, XML, Java, ActiveX, and/or the like) so that no download or installation is necessary.

Generally speaking, a user registered with the inventive communication system may use the Internet to access the system for updating information about himself. As mentioned earlier, this information includes not only profile information (e.g., name, phone number, email address, hobby, zodiac signs, blood group, favorite movie star, etc.) and availability information (e.g., available for telephone calls, available for chats, available for activity, etc.) but also current activity, current location (if applicable) and the duration of such current activity (if applicable). By way of example, a user may update his information to indicate that he is dining at a specific restaurant until 9 PM. This information may be made available to selected people to whom the posting user has granted permission earlier. The information may be simply updated to the system backend (which includes a webserver subsystem as well as any necessary gateway servers—such as those offered by cellular service providers—and a database subsystem for storing and accessing user information) to render them accessible to users having the proper access privilege. Alternatively or additionally, the posting of information may cause the posted information (or a notification pertaining thereto) to be automatically sent to selected users in the form of a link to a webpage or email.

In the mobile user coordination context, an invite facility is provided to permit a user to send invitations to selected other users (or to the public) to invite participation in a current or planned event. By way of example, a user may invite selected other users to a movie or tennis game by posting the activity, time and/or location pertaining to the event and send such information to the backend system for access. The event itself need not happen presently or even planned. The invitation may take the form of a query, for example, to allow the user sending out the invitation to ascertain the identity, the level of availability and/or willingness of the invitees in the proposed activity. Invitation may be used a way to indicate to a familiar group of users of one's current or proposed activity/location/time to allow others to respond appropriately, or may be used as a way to publish one's current or proposed activity/location/time to users known or unknown to facilitate meeting new people.

In some context, an invitation may take the form of a request and may carry the force of a command, depending on the relationship between the sender and the invitee (e.g., an invitation between a boss and a subordinate in the context of work may imply that there is no option as to participation on the part of the invitee/subordinate). This may be true if the communication is employed to facilitate work coordination among employees, for example.

Once the invitation is sent to the backend system, it may be made available for review by those who have been granted the proper access privilege. Alternatively or additionally, a message may be sent out to the invitees to alert them of the presence of the invitation so that a more rapid response can be facilitated. The option to be alerted may be specified by the sender, may be handled automatically by the system, or may be specified as an option by the recipient based on some filtering criteria.

In accordance with one aspect of the present invention, there is provided a search facility wherein a user may search among all users and/or posted information (or at least users and/or information to which the searcher has access privilege) for postings or users based on some search criteria. Since substantially all user profiles and posted information are kept in the database subsystem, such data is available to those having the proper access privilege. By way of example, a certain user may perform a search among selected ones of her friends for those currently engaged in shopping activities or planning to go shopping. As another example, a certain user may perform a search to check on the status, location, or activity pertaining to a specific other user. As another example, a given user may wish to search for anyone in the public who is interested in a particular activity, who may be in a particular location, or who may have a certain profile characteristic of interest. Since many of the items of information pertaining to user activities are time-sensitive, searches preferably take into account the time component whenever appropriate (e.g., for activity currently taking place or proposed in the future). Along with user profile and activity, the invention permits users to find one another based on location and time, as well as having a degree of control over the privacy of their user profile and posted information.

By implementing the proposed communication system on the web and allowing users to perform searches through the database of user profile/status/posted information, the present invention facilitates meeting people in a way that is simply unattainable before. The fact that the posted information pertains to current activities or proposed activities of mobile Internet users, and includes both the location and time dimensions, means that a user looking for partners for activities now has unprecedented exposure and access to an audience that is potentially as large as the Internet user base itself. By permitting a user to selectively grant/withhold access by other users to the information posted, privacy is enhanced. It is contemplated that privacy control setting may be provided to allow a given user to control whether another user or group of user has access to none, to a part, or to all of the information pertaining to the given user. By way of example, a given user may decide that some users may be granted access only to certain types of postings or even only part of the information in the postings and may set the privacy control setting associated with these information items accordingly. Of course privacy control setting may be associated with any aspect of the user's profile, status, location, time, etc. and may be set individually for specific users who may wish to access the given user's information (e.g., granting John access to the user's name and email but not business address). The point is that privacy control setting, if desired, can be associated with any item of information pertaining to a particular user to allow that user to finely control access by other users, groups of users, or the public. For usability reasons, however, groups of information may be grouped together and have a common privacy control setting in order to simplify access control.

Exemplary Process Flows

Exemplary process flows for signing up a user, for login, for private mode and public operations are shown below for users of Internet-enabled cellular phones. It should be noted that the specific process flows disclosed below are only exemplary and specific implementations may vary. Accordingly, it will be apparent to one skilled in the art that the present invention may be practiced without some of the specific steps in the process flows and that not every conventional, minute process step has been described in detail in order to not unnecessarily obscure the present invention.

1. Sign-Up
1.1. User has been invited (by the computer-implemented mobile user coordination system or by another user)
1.1.1. Clicks on invitation URL (containing the e-mail address to which the invitation was sent)
1.1.2. User is welcomed by the welcome screen of the Internet-enabled cellular phone
1.1.3. User is shown his mates' status information, else shown public mode information if no mates' status information is available (as in the case when, for example, the user is invited by the computer-implemented system instead of being invited by another user)
1.1.4. User is asked to sign-up Yes/No
1.1.5. If Yes, user is asked to enter phone # (if the e-mail address doesn't contain the phone number already) and choose a password
1.1.6. User is asked to save the next screen as a cached page for future logins if desired 1.1.7. User is asked to grant privilege to mate (who invited user)
1.1.8. User is asked to invite 3 mates by entering their e-mail addresses (makes score=3). This optional step is done to facilitate fast viral growth of the base of users
1.1.9. User is asked to enter profile information such as, for example, age, sex and other profile information. To submit a photo, he is requested to use the web site, if desired.
1.1.10. Enjoy! Sign-up is completed.
1.2. User has come in cold (e.g., by entering or clicking on URL on Internet-enabled cellular phone)
1.2.1. User enters/clicks on URL
1.2.2. User is welcomed by the welcome screen of the Internet-enabled cellular phone
1.2.3. User is shown public mode information
1.2.4. User is asked to sign-up Yes/No
1.2.5. User is asked to enter e-mail address, phone#, password
1.2.6. System sends out e-mail address verification e-mail (no response necessary), if desired
1.2.7. User is asked to save the next screen as cached page for future logins if desired
1.2.8. User is asked to invite 3 mates by entering their e-mail addresses (makes score=3). This optional step is done to facilitate fast viral growth of the base of users
1.2.9. User is asked to enter profile information such as, for example, age, sex and other profile information. To submit a photo, he is requested to use the web site, if desired.
1.2.10. Enjoy! Sign-up is completed.
2. Login
2.1. User comes in through the front door (by using the cached page and optionally with a password procedure)
2.1.1. User submits the cached page to the backend server (containing the e-mail address)
2.1.2. User is asked to approve "grant privilege" requests. User can grant privileges and additionally also pre-approve sharing of his information (by invitee with other users). In case of a group "grant privilege" request, user can grant privilege to the invitee or to the entire group.
2.1.3. User is asked to update status if the last entry has expired
2.1.4. User is shown last mode used with updated search results
2.1.5. Enjoy! Login is completed.
2.2. User comes in through the side door (by using bookmark or typing URL)
2.2.1. User enters URL
2.2.2. User is asked to enter e-mail ID and password
2.2.3. User is asked to approve "grant privilege" requests. User can grant privileges and additionally also pre-approve sharing of his information (by invitee with other users). In case of a group "grant privilege" request, user can grant privilege to the invitee or to the entire group.
2.2.4. User is asked to update status if the last entry has expired
2.2.5. User is shown last mode used with updated search results
2.2.6. Enjoy! Login is completed.
3. Private Mode
3.1. Check Custom Messages
3.1.1. The "custom message waiting" icon is displayed (custom message can be posted for an individual or for an entire group by a user)
3.1.2. By clicking on icon, the user is presented with a list of messages waiting which the user can selectively view. Custom messages may expire automatically as they become time-irrelevant.
3.2. Updates Personal Status
3.2.1. User selects current "location", "activity", "till when" from the customized options shown (location and activity option choices may be ordered by frequency and recency, the last options of these two fields being "custom", "custom by mate" and "custom by group". In case the user selects "custom" or "custom by mate" or "custom by group", he is taken to a screen where he can type the custom message and in case of "custom by mate" or "custom by group", additionally select recipient mate(s)/group(s) from the drop-down box. The time duration choices may be any amount of time, for example, 1, 2, 4 or 12 hours)
3.2.2. Clicks Go!
3.2.3. User shown updated screen, "custom message waiting" flags set for recipients
3.3. Contacts Mate
3.3.1. User scrolls and selects one of the mates user wishes to contact by clicking on the link
3.3.2. User is shown the full message (in case of a custom message/custom format) and given the option to call or send e-mail (without needing to know the number) or to set an "availability status change" alert. (this alert would notify the user by e-mail when the availability status of the mate changes)
3.4. Conducts a Search
3.4.1. User selects one or more of the search criteria (by location, activity, time, group, mate, freeform) from the drop-down boxes (in case more than 1 search criteria are chosen, it becomes an AND failing which an OR search) (contents of the drop-down boxes, particularly the location and activity boxes, are "current data dependent"—for example, Shibuya is shown as a choice only if the system has some data on Shibuya)
3.4.2. Presses Go!
3.4.3. System refreshes screen with matching mates information results (number of results displayed per page is a user-controlled setting)
3.5. Sends Invitations (by clicking on 'Mates')
3.5.1. User can enter e-mail address and send invitation as an individual or a group. User can customize the invitation by entering name, message greeting or choosing a format (for example, X-mas format or any other format). Additionally, the user can offer privileges to his information and also allow pre-approved sharing of user's information (by the invitee with others) at the same time. In case of a new user, the new user may be allowed to skip the "invite 3 mates" process in case user doesn't remember the phone numbers at that time by simply leaving behind names of mates but user may be asked provide the phone numbers at the time of subsequent logon.
3.5.2. In case the invitee is not a current user of the system, system sends out the invitation e-mail and in case the invitee is a current user of the system, system stores the invitation message to display it as a dialog-box at subsequent logon
3.5.3. In case the invitation message to a potential user is not responded to within 3 days, it is resent (if still not responded to within 7 days, the inviting party is notified and asked to provide an alternative e-mail address). In case the invitation message bounces, the inviting party is notified and asked to provide an alternate e-mail address.
3.5.4. After sending the invitation, the user is returned to the 'Mates' screen to allow the user to send out more invitations.
3.6. Modifies Privileges (by clicking on 'Mates')
3.6.1. The user can select the group (listed by recency and frequency, the last options being "other", "unfiled" and "all") or the mate (listed by recency and frequency, the last option being "other") and for that group/mate, change the privileges (in case the user selects "other" and clicks Go!, The user is taken to a separate screen with a full listing of his groups or mates respectively with a privilege Y/N drop-down box, Edit link, New link in front of each one of them)

3.6.2. After user changes mate/group privileges and clicks on Go!, privileges are updated in the system and the 'Mates' screen is shown again 3.6.3. User can also create a new group or edit properties of an existing group—Share Yes/No, Members, Name, Voice Channel On/Off, Delete (only permitted if he user created that group i.e. is the group owner)

3.6.4. User can also create a new mate (takes user back to invitation section of the 'Mates' screen') or edit the properties of an existing mate—Share Y/N, Crossing Paths Alert On/Off, Voice Channel On/Off, Name, Phone Number (useful if that mate has not provided any phone number), Group Affiliation(s), Delete 3.7. Updates Schedule 3.7.1. In the Schedule screen, user can create new, edit or delete future status entries of the format location—activity—time. User can view this schedule in the day or week view.

3.8. Changes Settings 3.8.1. Owner Info: screen name, alternate contact phone number, alternate contact e-mail address, locations (work/school, home, play), age, sex, blood group, zodiac sign, profession, hobbies/areas of interest 3.8.2. Preferences: Search results per screen (3/4/5), startup mode (last mode/private mode/public mode), voice channel on/off (for public mode), alert (via e-mail) when custom message waiting Y/N, customize public mode search criteria (can select any 2 of age/sex, blood group, zodiac sign, profession, hobbies), change e-mail address, change password 3.9. Special Promotions based on activity, location and/or time 3.9.1. User is shown specials information for the area-activity-time zone he is in (optionally matching his hobbies/areas of interest as gathered from, for example, profile or past activity)

3.9.2. User has the option of clicking on any of the specials and calling the merchant in advance 3.9.3. User also has the option of forwarding an entry in the specials section to a mate/group as a custom message (clicks on the "forward" link and is shown a new screen of the format of the bottom part of the 'Mates' screen where the user can select mates/groups to forward the specials info to)

3.9.4. The information on the user shopping pattern is recorded by the system (in the format: user-location-activity-time-merchant-product)

3.10. Events 3.10.1. User is shown public events information for the area-activity-time zone he is in matching his hobbies/areas of interest as gathered from, for example, profile or past activity 3.10.2. User has the option of clicking on any of the events and calling the event organizer in advance 3.10.3. User also has the option of forwarding an entry in the events section to a mate/group as a custom message (clicks on the "forward" link and is shown a new screen of the format of the bottom part of the 'Mates' screen where the user can select mates/groups to forward the events info to)

3.10.4. The information on the user behavior is recorded by the system (in the format: user-location-activity-time-event organizer-event)

3.11. Switch Mode 3.11.1. User is switched to the other mode

4. Public Mode 4.1. Check Custom Messages (same as Private Mode 3.1)

4.2. Updates Posting 4.2.1. User selects desired "location", "activity", "from when" from the customized options shown (location and activity option choices are ordered by frequency and recency, the last option being "custom". In case the user selects "custom", he is taken to a screen where he can type the custom message. The time duration choices may be any duration, for example, 1, 2, 4 or 12 hours in advance) 4.2.2. Clicks Go!

4.2.3. Desire registered in the database and user shown updated screen 4.3. Contacts a Person 4.3.1. User scrolls and selects one the persons he wishes to contact by clicking on the link 4.3.2. He is shown the full message (in case of a custom message/custom format) and given the option to view profile and call or send e-mail (without being shown the number)

4.4. Conducts a Search 4.4.1. User selects one or more of the search criteria (by location, activity, time, freeform and any 2 of age/sex, blood group, zodiac sign, profession, hobbies) from the drop-down boxes (in case more than 1 search criteria are chosen, it becomes an AND failing which an OR search) (contents of the drop-down boxes, particularly the location and activity boxes, are "current data dependent"—for example, Shibuya is shown as a choice only if the system has some data on Shibuya)

4.4.2. Presses Go!

4.4.3. System refreshes screen with matching people information results (number of results displayed per page is a user-controlled setting)

4.5. Deletes Posting 4.5.1. User is shown a list of all his status updates which he then has the option of selectively editing or deleting (postings are automatically deleted as time expires)

4.6. Edits Profile 4.6.1. User has the option of entering freeform profile information such as favorites, self-introduction, photo (optional—only through the web site and only of a fixed dimension, file size and file type(s))

4.7. Changes Settings (same as Private Mode 3.8)

4.8. Specials (same as Private Mode 3.9)

4.9. Events (same as Private Mode 3.10)

4.10. Switch Mode (same as Private Mode 3.11)

As mentioned earlier, the availability of the user's profile, status, present and future activity, present and future location, and the relevant time facilitates targeted marketing by allowing merchants to target their products/services in ways that are simply unavailable with current systems. Merchants now have access to the user's past behavior (shopping, click, coupon response, etc.) as well as present activity/location (e.g., shopping at a certain mall until 3 PM) as well as future activity/location (e.g., intend to shop tomorrow on a certain street from 5 PM-8 PM) as well as the possible participants as well as his demographics. With this information, the merchant can tailor the products/services most likely desired/purchased/have a chance of being considered by the user (and his group members) and offer these directly to the user and his group members via the Internet (e.g., direct email, short message, instant message, voice mail, e-coupons, and the like).

An exemplary arrangement for offering special promotions based on the user's profile, status, present and future activity, present and future location, and the relevant time is shown below. Again, it should be noted that the specific process flows disclosed below are only exemplary and specific implementations may vary. Accordingly, it will be apparent to one skilled in the art that the present invention may be practiced without some of the specific steps in the process flows and that not every conventional, minute process step has been described in detail in order to not unnecessarily obscure the present invention.

Exemplary Arrangement

1. Merchant goes to a section of the web site to upload his offer. He can select his target user profile by adjusting parameters for some or all of the options offered: age, gender, location(s), intention/activity, timeframe, alone/together, past purchases. The merchant can then define the offer, say "10% off at all purchases at Gap" in Harajuku on Sunday evening. The system assigns a unique promotion ID to this offer (which is used to later generate the e-coupon#s).

2. User updates his location and status (intention/activity/time) information and is shown search results on his mates. At the same time, he is shown specials and events for that time in that location matching his desired activity (shopping/eating, etc..), state (alone/with other male(s)/with other female), and past response (coupon clicks, and purchases).

3. At this point the system matches the user to the merchant using these criteria, some specified by the merchant and the rest determined by the system based on the user's status. In one embodiment, the final list of events/specials to be shown to the user may be sorted based on the cpm rate offered by the advertiser.

4. User can click on a special to display the e-coupon which has a unique number valid for that location-activity-time zone. User can show the displayed coupon to the cashier at the merchant to get the offered discount. (The user may also simply copy down the number and show it to the merchant.) If the merchant prefers, the user can be permitted to simply tell the merchant "I found your offer by the mobile user coordination system" in order to obtain the discount or premium. (Other "code-word" systems can be used (e.g., "I like jeans") or the user could "reserve" a special by telling the retailer his/her name via phone or email.)

5. The merchant uploads a flat file of coupon numbers to the website to receive macro-level analysis of the customers who responded to his offer. He can then use this information to better target customers for future offers.

6. The merchant has the option of giving users who redeemed coupons additional incentives via future discounts and other promotional offers. This may be done by providing a frequent shopper ID to the user-purchaser (useable to access a webpage). Or the user can click on a link on the coupon after exercising it to get more offers of that type in the future)

FIGS. 1-9 illustrate an exemplary implementation of the present invention for smart phones, i.e., cellular phones that are endowed with Internet capability for accessing web pages and web sites. In the example of FIGS. 1-9, a service called ImaHima is created to allow users to register, update information about themselves (which include identity, profile, status) and postings (which include current/proposed activity, current/future location, and/or the relevant time period) and to set access privilege for other users, and to permit users to search in order to coordinate for activities, meetings, etc.

In FIG. 1, an explanation of the exemplary implementation is provided, along with some illustrative example of how the Imahima service could be used. In FIG. 2, three sample views are provided, which include the home view on the left (of the private mode in this case). At the top of the page, the user is shown to be in private mode, engaged in work (other possible choices are shown above), and the location. The mates or friends/acquaintances information of interest is also shown. A "search" button is provided (with search options shown associated therewith by way of further explanation), along with a "Prefs" button for setting preferences pertaining to selected other users ("mates"), schedule, owner information, and other general settings.

The page view for viewing group information and setting access privilege for members of the group (center) to control access by those members to the information of the user "Neeraj". In this example, the group is called "Friends" and access privilege is binary (i.e., yes/no) although a finer degree of privacy control (e.g., down to control for individual items of user "Neeraj") can be provided if desired. As shown in this page view, the group may be edited and a facility is provided (e.g., "New") to allow the creation of new groups.

On the right page view, a page for setting Neeraj's schedule is provided. The schedule may be employed to automatically update (or update upon request by Neeraj) the information pertaining to Neeraj for other properly authorized users to see. In FIG. 3, an explanation of the two modes of operation is provided. In FIG. 4, an exemplary system architecture is proposed. Note that the architecture is only exemplary and quite technology specific. However, variations of the architecture is possible and should be well understood by those skilled in the art. In FIG. 5, exemplary registration and log-in procedures are illustrated. In the exemplary implementation, the newly registered user is requested to enter the data pertaining to 3 other users to facilitate rapid expansion of the user base. However, this is optional and not absolutely required although in general, such entry tends to be quite advantageous (and of course the more the better) in expanding the reach and usefulness of the Imahima service. In FIG. 6, greater details pertaining to one exemplary registration procedure is described. In FIG. 7, exemplary application flows are illustrated to show how the service would normally be used. In FIG. 8, exemplary views of the public mode and the private mode are illustrated.

In FIG. 9, exemplary views of the mates screen and the sign-on screen are shown.

Another aspect of the present invention is bar code based e-Coupons. Using the current/future location, current/future activity, the disclosed system enables a new kind of Just-In-Time Commerce. Advertisers can reach customers who are shopping in the vicinity of the store, event organizers can reach people with spare time in the neighborhood who may be interested in last minute discounted tickets. These people can see the ad, click on it to get detailed information, download the e-coupon (containing the bar code) and carry it to the store to get the discount. This is where the bar code based e-coupons become effective. They provide a unique and easy means of identifying the user of the disclosed system and the particular promotion they have chosen to respond to. By scanning the bar code (part of the e-coupon) digitally displayed on the screen of the mobile device (mobile phones, PDAs . . . ), the clerk at the store location can easily capture this unique coupon number. Once the e-coupon information has been captured, the applicable discount can be automatically offered to this user. At a later time, by uploading a flat file of these coupon numbers to the server, merchant can verify promotion effectiveness and go through macro analysis of the user who responded to the offer. FIG. 10 shows a schematic of how this feature operates.

The bar code can be scanned by a regular scanner available at the cash register of most stores and provides an easy mechanism for transferring the e-coupon information from the user to the merchant. The digital bar code enables several new functions:
   identification of the user
   identification of the coupon and the promotion
   identification of discounting information Once this e-coupon# has been captured by the merchant, a flat file of these coupon numbers can be uploaded to the server for further analysis:
   promotion effectiveness analysis
   macro analysis of the profile of the users that responded to the promotion The bar codes on the mobile phones thus close the loop between the system, the user and the participating merchant. It becomes possible to find out not only how many ad impressions we showed and how many impressions were clicked on, but also how many actual visitors it generated. The disclosed techniques provide a new kind of targeted marketing vehicle that offers the retailer unprecedented control and efficiency. It is the first system in marketing history that is able to target qualified individuals by proximity to a store or entertainment venue (or intend to be in the vicinity within a particular timeframe) and by current intention. It is like having trained salespeople in the street, who are able to spot and qualify prospects by demographic and psychographic profile, identify their immediate behavioral intentions, and present them with a custom-tailored promotional offer.

The disclosed system and techniques are highly suited to promotions that are activity/intention-specific, location specific or both. For example, the disclosed system might be used to offer an e-coupon to users who are near a particular boutique and who are engaged in "shopping" activity. Or it could offer an e-coupon useable at any one of a chain of fast food restaurants or drug stores throughout a metropolitan area, but that would be targeted by intention or time only (e.g., only users currently planning to eat would receive the coupon.)

This is possible because the disclosed system possesses knowledge of more aspects of individual consumer behavior than have been available in the past. In addition to the usual consumer supplied demographics obtained during signup, the disclosed system is able to track past coupon-response and purchase history, current physical location of user, current/desired activity (shopping/eating/working/etc.), and the presence of user's friends in the vicinity.

For the consumer, this means receiving messages that are perceived to be valuable because they are relevant and personalized, accurately anticipating and responding to real needs. The delivered messages dynamically integrate into the current activity and ongoing lifestyle of the user. The user is free to click for more information, leading ultimately to the advertiser's website, or to simply accept an e-coupon for a discount.

The following describes how the disclosed system works for targeted intention-specific promotions:
1. Merchant goes to a section of the web site to upload his offer. He can select his target user profile by tweaking all of the options offered: age, gender, location(s), intention/activity, timeframe, alone/together, past purchases. The merchant can then define the offer, say "10% off at all purchases at Gap" in Harajuku on Sunday evening. The system assigns a unique promotion ID to this offer (which is used to later generate the e-coupon#s).
2. User updates his location and status (intention/activity) information and is shown search results on his mates. At the same time, he is shown specials and events for that time in that location matching his desired activity (shopping/eating, etc . . . ), state (alone/with other male(s)/with other female), and past response (coupon clicks, and purchases).
3. At this point the system matches the user to the merchant using these criteria, some specified by the merchant and the rest determined by the system based on the user's status. The final list of events/specials to be shown to the user is sorted based on the cpm rate offered by the advertiser.
4. User can click on a special to display the e-coupon which has a unique number valid for that location-activity-time zone. User can show the displayed coupon to the cashier at the merchant to get the offered discount. (The user may also simply copy down the number and show it to the merchant.) If the merchant prefers, the user can be permitted to simply tell the merchant "I found your offer by the disclosed system" in order to obtain the discount or premium. (Other "code-word" systems can be used (e.g., "I like jeans") or the user could "reserve" a special by telling the retailer his/her name via phone or email.)
5. The merchant uploads a flat file of coupon numbers to the system website to receive macro-level analysis of the customers who responded to his offer. He can then use this information to better target customers for future offers.
6. The merchant has the option of giving users who redeemed coupons additional incentives via future discounts and other promotional offers.

This may be done by providing a frequent shopper ID to the user-purchaser (useable to access a webpage). Or the user can click on a link on the coupon after exercising it to get more offers of that type in the future). Apart from systems and methods, computer program products are also within the scope of the disclosed teaching. These computer program products comprise instructions on computer readable media that enable a computer to perform the methods disclosed herein. The instructions are not limited, and include but not limited to, source code, object code and executables. The computers on which the instructions are implemented include, but not limited to, minis, micros, and mainframes. The computer readable medium includes, but not limited to, floppies, RAMs, ROMs, hard drives, magnetic tapes, cartridges, CDs, DVDs, and internet downloads.

While this invention has been described in terms of several preferred embodiments, there are alterations, permutations, and equivalents which fall within the scope of this invention. By way of example, although the point-and-click and visual interface are discussed throughout, it is contemplated that user interfaces involving speech recognition (for data input) and computer-generated voice may also be employed to exchange present/future location/activity. Of course other methods of data input/output may also be employed. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for sharing current location information among users by using relationship information stored in a database, the method comprising:
   a) receiving data sent from a sender's communication device, the data containing self-declared location information indicating a physical location of the sender at the time the sender sent the data determined without the aid of automatic location determination technology;
   b) determining from the data the sender's identity and based on the sender's identity and the relationship information stored in the database, determining a plurality of users associated with the sender and who have agreed to receive messages about the sender, each of the plurality of users having a communication device;

c) wherein the data sent from the sender's communication device does not contain an indication of contact information of said plurality of users; and d) sending a notification message to the communication devices of, among the users, only the determined users, the notification message containing the sender's self-declared location information.

2. The method according to claim 1, wherein the sender's communication device is a mobile telephone.

3. The method according to claim 2, wherein the communication device of at least one of the plurality of users is a mobile telephone.

4. The method according to claim 1, wherein the notification message containing the sender's self-declared location information invites the users to meet the sender at the physical location indicated by the self-declared location information.

5. The method according to claim 1, wherein the physical location has a name and the sender manually enters the self-declared location information into the sender's communication device by typing the name of the physical location.

6. The method according to claim 1, wherein the physical location has a name and the sender manually enters the self-declared location information into the sender's communication device by selecting the name of the physical location.

7. The method according to claim 1, wherein the physical location has a name and the sender manually enters the self-declared location information into the sender's communication device by selecting the location on a map.

8. A computer-implemented method for sharing current location information among users by using relationship information stored in a database, the method comprising:

a) receiving data sent from a sender's communication device, the data containing self-declared location information indicating a physical location of the sender at the time the sender sent the data, wherein the physical location has a name and the sender manually enters the self-declared location information into the sender's communication device by selecting the name of the physical location from a list of location names generated with the aid of automatic location-determination technology;

b) determining from the data the sender's identity and based on the sender's identity and the relationship information stored in the database, determining a plurality of users associated with the sender and who have agreed to receive messages about the sender, each of the plurality of users having a communication device;

c) wherein the data sent from the sender's communication device does not contain an indication of contact information of said plurality of users; and d) sending a notification message to the communication devices of, among the users, only the determined users, the notification message containing the sender's self-declared location information.

9. The method according to claim 1, further comprising posting a message on a server computer indicating said physical location of the sender for access by said plurality of users.

10. A computer-implemented system for sharing current location information between a sender having a communication device and a plurality of users, each having a communication device, comprising:

a) a database unit having stored therein contact information for the plurality of users, and relationship information associating the sender with each of the plurality of users based on a relationship between the sender and the each of the plurality of users; and b) a server device coupled to the database unit and to a communications network, wherein the server device receives data sent from the sender's communication device that contains self-declared location information indicating a physical location of the sender at the time the sender sent the data determined without the aid of automatic location determination technology, wherein in response to receiving the data the server device:

i. determines from the data the sender's identity, ii. determines, based on the sender's identity and the relationship information, a plurality of users to whom to send a notification message and who are associated with the sender and have agreed to be sent the notification message, and iii. sends the notification message to the communication devices of, among the users, only the determined users, the notification message containing the sender's self-declared location information;

c) wherein the data sent from the sender's communication device does not contain an indication of contact information of said plurality of users.

11. A computer-implemented system according to claim 10, wherein the sender's communication device is a mobile telephone.

12. A computer-implemented system according to claim 11, wherein the communication device of at least one of the plurality of users is a mobile telephone.

13. A computer-implemented system according to claim 10, wherein the notification message containing the sender's self-declared location information invites the users to meet the sender at the physical location indicated by the self-declared location information.

14. A computer-implemented system according to claim 10, wherein the physical location has a name and the sender manually enters the self-declared location information into the sender's communication device by typing the name of the physical location.

15. A computer-implemented system according to claim 10, wherein the physical location has a name and the sender manually enters the self-declared location information into the sender's communication device by selecting the name of the physical location.

16. A computer-implemented system according to claim 10, wherein the physical location has a name and the sender manually enters the self-declared location information into the sender's communication device by selecting the location on a map.

17. A computer-implemented system for sharing current location information between a sender having a communication device and a plurality of users, each having a communication device, comprising:

a) a database unit having stored therein contact information for the plurality of users, and relationship information associating the sender with each of the plurality of users based on a relationship between the sender and the each of the plurality of users; and b) a server device coupled to the database unit and to a communications network, wherein the server device receives data sent from the sender's communication device that contains location information indicating a physical location of the sender at the time the sender sent the data, wherein the physical location has a name and the sender manually enters the self-declared location information into the sender's communication device by selecting the name of the physical location from a list of location names generated with the aid of automatic location-determination technology, wherein in response to receiving the data the server device:
  i. determines from the data the sender's identity,
  ii. determines, based on the sender's identity and the relationship information, a plurality of users to whom to send a notification message and who are associated with the sender and have agreed to be sent the notification message, and
  iii. sends the notification message to the communication devices of, among the users, only the determined users, the notification message containing the sender's self-declared location information;
c) wherein the data sent from the sender's communication device does not contain an indication of contact information of said plurality of users.

18. A computer-implemented system according to claim 10, further comprising:
a) a database unit having stored therein the sender's self-declared location information received by the server device; and
b) a server device coupled to the database unit and to a communications network, wherein the server device receives a data request sent from the communication device of at least one of the plurality of users, wherein in response to receiving the data request the server device:
  i. determines from the data the user's identity,
  ii. determines, based on the user's identity and the relationship information, a sender whose message to send and who is associated with the user and has agreed to send the message containing his or her self-declared location information, and
  iii. sends a message indicating the physical location of the sender to the communication device of said user.

19. A computer-implemented method for sharing current activity information among users by using relationship information stored in a database accessible by a server computer, the method comprising:
a) receiving data sent from a sender's communication device, the data containing activity information indicating a current activity of the sender at the time the sender sent the message;
b) the server computer determining from the data the sender's identity and based on the sender's identity and the relationship information stored in the database, determining a plurality of users associated with the sender who have agreed to receive messages about the sender, each of the plurality of users having a communication device;
c) wherein the data sent from the sender's communication device does not contain an indication of contact information of said plurality of users; and
d) sending a notification message to the communication devices of, among the users, only the determined users, the notification message containing the activity information indicating the current activity of the sender.

20. The method according to claim 19, wherein the sender's communication device is a mobile telephone.

21. The method according to claim 20, wherein the communication device of at least one of the plurality of users is a mobile telephone.

22. The method according to claim 19, wherein the notification message containing the sender's current activity information invites the users to participate with the sender in the current activity.

23. The method according to claim 19, wherein the current activity has a description and the sender manually enters the current activity information into the sender's communication device by typing the description of the current activity.

24. The method according to claim 19, wherein the current activity has a name and the sender manually enters the current activity information into the sender's communication device by selecting the name of the current activity.

25. The method according to claim 19, further comprising posting a message on the server indicating said current activity of the sender for access by said plurality of users.

26. A computer-implemented method for exchanging messages among a plurality of users, using relationship information stored in a database accessible by a server computer, the method comprising:
a) receiving at the server computer, from a first user's Internet-capable device, a message, along with location information indicating a most recently updated physical location of the first user; and
b) in response thereto, automatically causing the message and the location information to be sent over the Internet to at least one second user, and, among the plurality of users, to only the at least one second user;
c) wherein the at least one second user is selected by the server computer based, at least in part, on data stored in the database identifying one or more users of the plurality of users who are associated with the first user;
d) wherein the stored data identifying users of the plurality of users associated with the first user is indicative of an agreed-upon connection between the first user and each of said users of the plurality of users; and
e) wherein the message and the location information received at the server computer does not contain an indication of contact information of said at least one second user.

27. The method of claim 26 wherein the information indicating the physical location of the first user is self-declared location information.

28. The method of claim 27 wherein the information indicating the physical location of the first user comprises a specific address.

29. The method of claim 27 wherein the information indicating the physical location of the first user comprises less information than would be sufficient to determine either of a specific address and a set of GPS coordinates.

30. The method according to claim 26, wherein the physical location has a name and the first user manually enters his or her self-declared location information into the first user's communication device by selecting the name of the physical location from a list of location names generated with the aid of automatic location-finding technology.

31. The method of claim 26 wherein the information indicating the physical location of the first user is determined with the aid of automatic location-finding technology.

32. The method of claim 31 wherein the information indicating the physical location of the first users is determined with the aid of GPS.

33. The method of claim 31 wherein the information indicating the physical location of the first users is determined with the aid of cellular cell-tower triangulation.

34. The method of claim 31 wherein the information indicating the physical location of the first users is determined with the aid of WiFi.

35. The method of claim 31 wherein the information indicating the physical location of the first users is determined with the aid of IP address geolocation.

36. The method according to claim 31, wherein the physical location has a name and the first user manually enters the location information into the first user's communication device by selecting the name of the physical location from a list of location names generated with the aid of automatic location-finding technology.

37. The method of claim 26 further comprising automatically formatting for display information indicating a most recently updated physical location received from each of a plurality of second users, wherein the format allows the location information of the plurality of second users to be simultaneously visible.

38. The method of claim 37 wherein automatically formatting for display comprises formatting for display the location information of only those of the plurality of second users within a first-user-controlled geographic distance from the most recently updated location of the first user.

39. The method of claim 37 wherein automatically formatting for display comprises formatting for display the location information of a subset of the users of the plurality of users associated with the first user.

40. The method of claim 26 wherein the Internet-capable device of the first user is an Internet-capable mobile device.

41. The method of claim 40 wherein the Internet-capable mobile device is a cellular phone.

42. The method of claim 40 wherein the Internet-capable mobile device is a smartphone.

43. The method of claim 40 wherein the Internet-capable mobile device is a laptop computer.

44. The method of claim 40 wherein the Internet-capable mobile device is a PDA.

45. The method of claim 40 further comprising, in response to receipt of the message by the server computer, automatically making the message and information indicating a most recently updated physical location of the first user available for access over the Internet by the at least one second user.

46. The method of claim 26 further comprising:
  i. receiving, at the server computer, access parameters indicating a subset of the users of the plurality of users associated with the first user; and
  ii. wherein part (b) further comprises causing the message to be sent to those of the at least one second user who fit the access parameters, and, among the plurality of users, to only those of the at least one second user who fit the access parameters.

47. The method of claim 26 further comprising automatically formatting for display a plurality of entries indicating a message received from the at least one second user, wherein the format allows the plurality of entries to be simultaneously visible.

48. The method of claim 26 further comprising:
  i. receiving a query at the server computer from the first user's Internet-capable mobile device, which query contains one or more location parameters; and
  ii. in response thereto, automatically reporting to the first user information indicating those of the at least one second user whose most recently updated location information fits the location parameters.

49. The method of claim 48 further comprising, in response to a request from the first user, automatically causing an invitation from the first user to be sent to at least one of those second users reported to the first user whose location information fits the location parameters.

50. The method of claim 49 wherein the invitation comprises a proposed meeting location.

51. The method of claim 50 wherein the invitation further comprises a proposed activity.

52. The method of claim 26 wherein the message further comprises information indicating a personal status of the first user.

53. The method of claim 52 wherein the message further comprises information indicating a period of time for which the status of the first user is valid.

54. The method of claim 52 further comprising:
  i. receiving a query at the server computer from the first user's Internet-capable mobile device, which query contains one or more location parameters and one or more status parameters; and
  ii. in response thereto, automatically reporting to the first user information indicating those of the at least one second user whose most recently updated location information fits the location parameters and whose most recently updated personal status information fits the status parameters.

55. The method of claim 54 further comprising, in response to a request from the first user, automatically causing an invitation from the first user to be sent to at least one of those second users reported to the first user whose location information fits the location parameters and whose personal status information fits the status parameters.

56. The method of claim 26 wherein the message received by the server computer further comprises information identifying the first user.

57. The method of claim 26 wherein the message is received by the server computer over the Internet.

58. The method of claim 26 wherein the message is received by the server computer over an SMS network.

59. The method of claim 26 wherein the message is received by the server computer over a mobile communications network.

60. A computer-implemented method for exchanging messages among a plurality of users, using relationship information stored in a database accessible by a server computer, the method comprising:
  a) receiving at the server computer, from a first sending user's Internet-capable device, a message, which message identifies the user who originated the message, and self-declared location information indicating a most recently updated physical location of the first sending user;
  b) in response thereto, automatically causing the message and the self-declared location information to be sent over the Internet to a plurality of receiving users, and, among the plurality of users, to only the plurality of receiving users; and
  c) repeating parts (a) and (b) for messages received at the server computer from a plurality of second sending users;
  d) wherein the receiving users are selected by the server computer based, at least in part, on entries in a database identifying those of the plurality of users associated with each sending user;
  e) wherein the entries in the database are indicative of an agreed-upon connection between sending user and a user of the plurality of users associated with that sending user; and
  f) wherein the messages and the self-declared location information received at the server computer from the first sending user and from the second sending user do not identify either the receiving users or the contact information of the receiving users for said messages.

61. The method of claim 60 further comprising, further in response to part (a), automatically formatting for display information indicating a most recently updated physical location received from each of a plurality of second sending users, wherein the format allows the location information of the plurality of second sending users to be simultaneously visible.

62. The method of claim 60 further comprising:
   i. receiving a query at the server computer from the first sending user's Internet-capable mobile device, which query contains one or more location parameters; and
   ii. in response thereto, automatically reporting to the first sending user information indicating those of the plurality of receiving users whose most recently updated location information fits the location parameters.

63. The method of claim 60 further comprising:
   i. receiving, at the server computer, access parameters indicating a subset of the users of the plurality of users associated with the first user; and
   ii. wherein part (b) further comprises causing the message to be sent to those of the at least one second user who fit the access parameters, and, among the plurality of users, to only those of the at least one second user who fit the access parameters.

64. A computer-implemented method for sharing current activity information among a plurality of users, using relationship information stored in a database accessible by a server computer, the method comprising:
   a) receiving at the server computer, from a first user's Internet-capable device, activity information indicating a current activity of the first user at the time the first user sent the activity information; and
   b) in response thereto, automatically causing the activity information to be sent over the Internet to at least one second user, and, among the plurality of users, to only the at least one second user;
   c) wherein the at least one second user is selected by the server computer based, at least in part, on data stored in the database identifying one or more users of the plurality of users who are associated with the first user;
   d) wherein the stored data identifying users of the plurality of users associated with the first user is indicative of an agreed-upon connection between the first user and each of said users of the plurality of users; and
   e) wherein the activity information received at the server computer does not contain an indication of contact information of said at least one second user.

65. The method according to claim 64, wherein the first user's Internet-capable device is a mobile telephone.

66. The method according to claim 65, wherein the Internet-capable device is a personal computer.

67. The method according to claim 64, wherein the current activity has a description and the first user manually enters the current activity information into the first user's communication device by typing the description of the current activity.

68. The method according to claim 64, further comprising automatically making the information indicating said current activity of the first user available for access over the Internet by the at least one second user.

69. The method of claim 64 further comprising:
   i. receiving, at the server computer, access parameters indicating a subset of the users of the plurality of users associated with the first user; and
   ii. wherein part (b) further comprises causing the message to be sent to those of the at least one second user who fit the access parameters, and, among the plurality of users, to only those of the at least one second user who fit the access parameters.

70. A computer-implemented method for exchanging messages among a plurality of users, using relationship information stored in a database accessible by a server computer, the method comprising:
   a) receiving at the server computer, from a first user's Internet-capable device, activity information indicating a current activity of the first user at the time the first user sent the activity information, along with location information indicating a most recently updated physical location of the first user; and
   b) in response thereto, automatically causing the activity information and the location information to be sent over the Internet to at least one second user, and, among the plurality of users, to only the at least one second user;
   c) wherein the at least one second user is selected by the server computer based, at least in part, on data stored in the database identifying one or more users of the plurality of users who are associated with the first user;
   d) wherein the stored data identifying users of the plurality of users associated with the first user is indicative of an agreed-upon connection between the first user and each of said users of the plurality of users; and
   e) wherein the activity information and the location information received at the server computer does not contain an indication of contact information of said at least one second user.

71. The method according to claim 70, wherein the first user's Internet-capable device is a mobile telephone.

72. The method according to claim 71, wherein the Internet-capable device is a personal computer.

73. The method according to claim 70, wherein the current activity has a description and the first user manually enters the current activity information into the first user's communication device by typing the description of the current activity.

74. The method according to claim 70, further comprising automatically making the information indicating said current activity and location information of the first user available for access over the Internet by the at least one second user.

75. The method of claim 70 further comprising:
   i. receiving, at the server computer, access parameters indicating a subset of the users of the plurality of users associated with the first user; and
   ii. wherein part (b) further comprises causing the message to be sent to those of the at least one second user who fit the access parameters, and, among the plurality of users, to only those of the at least one second user who fit the access parameters.

76. A computer-readable non-transitory data storage medium comprising indicia of instructions for a processor to perform a method of exchanging messages among a plurality of users, using relationship information stored in a database accessible by a server computer, the method comprising:
   a) receiving at the server computer, from a first user's Internet-capable device, a message, and location information indicating a most recently updated physical location of the first user; and
   b) in response thereto, automatically causing the message and the location information to be sent over the Internet to at least one second user, and, among the plurality of users, to only the at least one second user;
   c) wherein the at least one second user is selected by the server computer based, at least in part, on data stored in the database identifying one or more of the plurality of users who are associated with the first user;
   d) wherein the stored data is indicative of an agreed-upon connection between the first user and each of the associated users; and e) wherein the message and the location information received at the server computer from the first sending user does not identify the at least one second users.

77. The data storage medium of claim 76 wherein the data storage medium further comprises indicia of instructions for a processor to perform a method that further comprises, in response to receipt of the message by the server computer, automatically making the message and information indicating a most recently updated physical location of the first user available for review over the Internet by the at least one second user.

78. The data storage medium of claim 76 wherein the data storage medium further comprises indicia of instructions for a processor to perform a method that further comprises automatically formatting for display information indicating a most recently updated physical location received from each of a plurality of the at least one second user, wherein the format allows the location information of the plurality of the second users to be simultaneously visible.

79. The data storage medium of claim 78 wherein the data storage medium further comprises indicia of instructions for a processor to perform a method further comprising:
  i. receiving a query at the server computer from the first user's Internet-capable mobile device, which query contains one or more location parameters; and
  ii. in response thereto, automatically causing to be sent to the first user information indicating those of the at least one second users whose most recently updated location information fits the location parameters.

80. A computer system for exchanging messages between a plurality of users comprising:
  a) a database storing entries indicative of an agreed-upon connection between pairs of the users; and
  b) a computer having an Internet interface, coupled to the database and structured and programmed to receive from a first user's Internet-capable device, a message, and location information indicating a most recently updated physical location of the first user, and in response, to:
    i. select at least one second user based, at least in part, on the entries stored in the database associated with the first user; and
    ii. automatically cause the message and location information to be sent over the Internet to the at least one second user, and among the plurality of users other than the first user, to only the at least one second user;
  c) wherein the message and the location information received at the computer from the first user's Internet-capable device does not identify the recipient of said message.

81. The computer system of claim 80 wherein the computer is further structured and programmed to, in response to receipt of the message, automatically make the message and information indicating a most recently updated physical location of the first user available for review over the Internet by the at least one second user.

82. The computer system of claim 80 wherein the computer is further structured and programmed to, in response to receipt of the message, automatically format for display information indicating a most recently updated physical location received from each of a plurality of second users, wherein the format allows the location information of the plurality of second users to be simultaneously visible.

83. The computer system of claim 80 wherein the computer is further structured and programmed to:
  i. receive a query from the first user's Internet-capable mobile device, which query contains one or more location parameters; and
  ii. in response thereto, automatically cause to be sent to the first user information indicating those of the at least one second users whose most recently updated location information fits the location parameters.

\* \* \* \* \*

UNITED STATES PATENT AND TRADEMARK OFFICE
CERTIFICATE OF CORRECTION

PATENT NO. : 8,423,622 B2  
APPLICATION NO. : 13/211970  
DATED : April 16, 2013  
INVENTOR(S) : Neeraj Jhanji Page 1 of 1

It is certified that error appears in the above-identified patent and that said Letters Patent is hereby corrected as shown below:

In the Drawings:

Please correct the following errors:

Figure 4, delete "1 Send" and substitute --4 Send-- and delete "1 Query imaHima" and substitute --3 Query imaHima--.

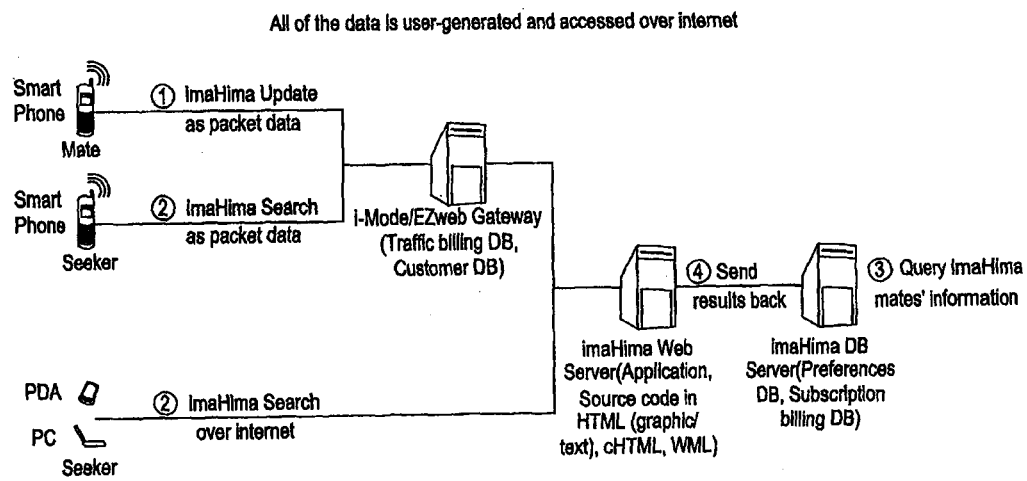

Signed and Sealed this
Second Day of July, 2013

Teresa Stanek Rea
*Acting Director of the United States Patent and Trademark Office*